United States Patent [19]

Smolka et al.

[11] Patent Number: 4,755,319

[45] Date of Patent: Jul. 5, 1988

[54] PROCESS FOR THE PRODUCTION OF SOLID, POURABLE WASHING OR CLEANING AGENTS WITH A CONTENT OF A CALCIUM BINDING SILICATE

[75] Inventors: Heinz Smolka, Langenfeld Rhld.; Milan J. Schwuger, Haan Rhld, both of Fed. Rep. of Germany

[73] Assignee: Henkel Kommanditgellschaft auf Aktien, Duesseldorf, Fed. Rep. of Germany

[21] Appl. No.: 437,518

[22] Filed: Oct. 29, 1982

Related U.S. Application Data

[63] Continuation-in-part of Ser. No. 304,791, Sep. 23, 1981, abandoned, which is a continuation of Ser. No. 813,436, Jul. 7, 1977, Pat. No. 4,330,423, which is a continuation of Ser. No. 458,303, Apr. 5, 1974, abandoned.

[30] Foreign Application Priority Data

Jun. 20, 1973 [AT] Austria ........................ 5458/73
Sep. 25, 1973 [AT] Austria ........................ 8237/73

[51] Int. Cl.[4] ........................ C01B 33/28; C02F 1/42; C11D 3/12; C11D 11/00

[52] U.S. Cl. ........................ 252/174.25; 252/131; 252/140; 252/155; 252/179; 423/329

[58] Field of Search ........... 252/131, 140, 155, 174.25, 252/179; 423/328, 329

[56] References Cited

U.S. PATENT DOCUMENTS

| | | | |
|---|---|---|---|
| 3,254,034 | 5/1966 | Dwyer | 252/430 |
| 3,425,948 | 2/1969 | Otrhalek | 252/558 |
| 3,451,935 | 6/1969 | Roald | 252/135 |
| 3,472,784 | 10/1969 | Poe | 252/539 |
| 3,639,289 | 2/1972 | Heymer | 252/110 |
| 3,676,352 | 7/1972 | Grimm | 252/99 |
| 3,743,610 | 7/1973 | Weldes | 252/527 |
| 3,886,079 | 5/1975 | Burke | 252/109 |
| 3,929,678 | 12/1975 | Laughlin | 252/526 |
| 4,274,975 | 6/1981 | Corkill | 252/140 |
| 4,330,423 | 5/1982 | Smolka | 252/99 |

*Primary Examiner*—Dennis Albrecht
*Attorney, Agent, or Firm*—Ernest G. Szoke; Nelson Littell, Jr.; Henry E. Millson, Jr.

[57] ABSTRACT

A process for the production of solid, pourable, washing or cleaning agents containing surface-active compounds, builders, and calcium binding compounds, said calcium binding compounds consisting of at least one finely-dispersed water-insoluble silicate compound containing at least some combined water and having a calcium binding power of at least 50 mg CaO/gm of anhydrous active substance and the formula on the anhydrous basis:

$$(M_{2/n}O)_x \cdot Me_2O_3 \cdot (SiO_2)_y$$

where M is a cation of the valence n, exchangeable with calcium, x is a member of from 0.7 to 1.5, Me is a member selected from the group consisting of aluminum and boron, and y is a number form 0.8 to 6, comprising the steps of mixing said silicate compound, while still moist from its production, with at least part of the remaining components of the washing and cleaning agent and converting the entire mixture of components into a pourable product.

18 Claims, No Drawings

PROCESS FOR THE PRODUCTION OF SOLID, POURABLE WASHING OR CLEANING AGENTS WITH A CONTENT OF A CALCIUM BINDING SILICATE

This is a continuation-in-part of Ser. No. 304,791, filed Sept. 23, 1981, now abandoned, which was a continuation of Ser. No. 813,436, filed July 7, 1977, now U.S. Pat. No. 4,330,423, which was a continuation of Ser. No. 458,303, filed Apr. 5, 1974, now abandoned.

THE PRIOR ART

As known, the detergents used in the household, in commercial establishments and in industry, frequently contain large quantities of condensed phosphates, particularly tripolyphosphates. These are provided to sequester the hardness formers of tap water and are responsible to a great extent for increasing the cleaning power of the capillary-active washing substances. The phosphorus content of these agents has been criticized by the public in connection with questions of the protection of the environment. The view is frequently expressed that the phosphates, which arrive in the rivers and lakes after treatment of the sewage, have great influence on the eutrophication of the waters, and is said to lead to an increase of the growth of algae and of oxygen consumption. It has, therefore, been tried to eliminate phosphate from the washing and cleaning processes or from the agents used for this purpose, or at least to substantially reduce its proportion.

In copending U.S. patent application Ser. No. 458,306, filed Apr. 4, 1974, abandoned in favor of its continuation Ser. No. 800,308, filed May 25, 1977, abandoned in favor of its continuation-in-part Ser. No. 956,851, filed Nov. 2, 1978, abandoned in favor of its continuation Ser. No. 330,645, filed Dec. 14, 1981, a solution to the above-outlined problem is set forth with the development of an improvement in the process of washing soiled textiles by contacting soiled textiles with an aqueous solution containing a water softening agent for a time sufficient to disperse or dissolve the soil from said soiled textiles into said aqueous solution, separating said aqueous solution and recovering said textiles substantially soil-free, which improvement consists of using at least one finely-dispersed, water-insoluble silicate compound containing at least some combined water and having a calcium binding power of at least 50 mg CaO/gm of anhydrous active substance and the formula on the anhydrous basis:

$$(M_{2/n}O)_x.Me_2O_3.(SiO_2)y$$

where M is a cation of the valence n, exchangeable with calcium, x is a number of from 0.7 to 1.5, Me is a member selected from the group consisting of aluminum and boron, and y is a number from 0.8 to 6, as said water softening agent.

OBJECTS OF THE INVENTION

An object of the present invention is the development of processes for the production of the washing and cleaning agents having a content of said silicate compound, particularly with the retention of the alkali values present in the production of the silicate compounds.

Another object of the invention is the development of an improvement hn the process for the production of solid, pourable washing and cleaning agents comprising the steps of mixing the ingredients including surfaceactive compounds, builders and calcium binding compounds and converting the mixture to a pourable product, the improvement consisting of mixing at least one compound inhibiting alkaline earth metal ion precipitation from aqueous solutions consisting of finely-dispersed, water-insoluble silicate compounds containing at least some combined water and having a calcium binding power of at least 50 mg CaO/gm of anhydrous active substance and the formula on the anhydrous basis:

$$(M_{2/n}O)_x.Me_2O_3.(SiO_2)_y$$

where M is a cation of the valence n, exchangeable with calcium, x is a member of from 0.7 to 1.5, Me is a member selected from the group consisting of aluminum and boron, and y is a number from 0.8 to 6, as said calcium binding compounds, in the moist state with at least part of the remaining ingredients.

A further object of the invention is the development of a process for the recovering of alkaline values in the aqueous suspension of a finely-dispersed, water-insoluble silicate compound containing at least some combined water and having a calcium binding power of at least 50 mg CaO/gm of anhydrous active substance and the formula on the anhydrous basis:

$$(A_2O)_x.Me_2O_3.(SiO_2)_y$$

where A is a cation of an alkali metal, exchangeable with calcium, x is a number from 0.7 to 1.5, Me is a member selected from the group consisting of aluminum and boron, and y is a number from 0.8 to 6, produced with an excess of $A_2O$, which consists of neutralizing the excess $A_2O$ with at least one acid reacting anion customarily employed in alkali metal salt form in washing and cleaning agents, converting said neutralized suspension into a pourable form and incorporating said pourable finely-divided solids in a washing and cleaning agent composition.

These and other objects of the invention will become more apparent as the description thereof proceeds.

DESCRIPTION OF THE INVENTION

The invention relates to a method for the production of solid, pourable washing and cleaning agents with a content of finely-divided, water-insoluble compounds, whose composition corresponds to the general formula:

$$(Kat_{2/n}O)_x.Me_2O_3.(SiO_2O)_y$$

in which Kat is a cation exchangeable with calcium, of the valency n, x is a number from 0.7 to 1.5, Me is boron or aluminum, and y is a number from 0.8 to 6, preferably from 1.3 to 4, which compounds have a calcium binding power of at least 50 mg CaO/gm of anhydrous active substance (AS). The method is characterized in that the moist compounds are mixed with at least a part of the remaining constituents of the washing or cleaning agent and this mixture is converted into a solid, pourable product by methods known in themselves.

More particularly, the invention relates to the process for the production of solid, pourable washing and cleaning agents comprising the steps of mixing the ingredients including surface-active compounds, builders and calcium binding compounds and converting the mixture to a pourable product, the improvement consisting of mixing at least one compound inhibiting alkaline earth metal ion precipitation from aqueous solutions consisting of finely-dispersed, water-insoluble silicate compounds containing at least some combined water and having a calcium binding power of at least 50 mg CaO/gm of anhydrous active substance and the formula on the anhydrous basis:

$$(M_{2/n}O)_x.Me_2O_3.(SiO_2)_y$$

where M is a cation of the valence n, exchangeable with calcium, x is a number of from 0.7 to 1.5, Me is a member selected from the group consisting of aluminum and boron, and y is a number from 0.8 to 6, as said calcium binding compounds, in the moist state with at least part of the remaining ingredients.

In addition, the invention relates to an improvement in a process for preparing a solid, pourable, washing and cleaning multicomponent composition by mixing the components including at least one crystallized water-insoluble alkali metal aluminosilicate produced synthetically and having a calcium binding power when measured at 22° C. by the calcium binding power test method set out in the specification, of at least 50 mg CaO/gm of anhydrous active substance and the formula on the anhydrous basis:

$$(M_2O)_x.Al_2O_3.(SiO_2)_y$$

where M is an alkali metal, x is a number from 0.7 to 1.5, and y is a number from 1.3 to 4, the improvement which comprises mixing the crystallized aluminosilicate in the mcist state with at least part of the other components and recovering said solid, pourable, washing and cleaning composition.

The low phosphate or phosphate-free washing agents produced according to the invention are intended essentially for textile treatment, while the corresponding cleaning agents are preferentially intended for use in numerous other sectors of technology and of the household for a variety of cleaning tasks. Examples of such applications are the cleaning of implements, machines, pipelines and vessels of wood, plastic, metal, ceramic, glass, etc. in the industry or in commercial operations, the cleaning of furniture, walls, floors of objects of ceramic, glass, metal, wood, plastic, the cleaning of polished or lacquered areas in the household, etc. Especially important applications of the agents to be produced according to the invention are the washing and bleaching of textiles and the mechanical cleaning of utensils of any kind in the industry, in commercial laundries and in the household.

The calcium binding power of the silicate compounds described above can be as high as 200 mg CaO/gm of anhydrous active substances (AS) and preferably is in the range of 100 to 200 mg CaO/gm AS.

The cation M or Kat employed is preferably sodium. However, the same can also be totally or partially replaced by other cations exchangeable with calcium, such as lithium, potassium, ammonium or magnesium, as well as by the cations of water-soluble organic bases, for example, by those of primary, secondary or tertially alkylamines or alkylolamines with not more than 2 carbon atoms per alkyl radical, or not more than 3 carbon atoms per alkylol radical.

These compounds will hereafter be called "aluminosilicates" for simplicity's sake. Preferred are sodium aluminosilicates. All data given for their production and use also apply to the other compounds defined above.

The above-defined aluminosilicates can be produced synthetically in a simple manner, for example, by reacting water-soluble silicates with water-soluble aluminates in the presence of water. To this end aqueous solutions of the starting materials can be mixed with each other, or one component which is present in solid form can be reacted with another component which is present as an aqueous solution. The desired aluminosilicates can also be obtained by mixing both solid components in the presence of water, preferably with comminution of the mixture. Aluminosilicates can also be produced from $Al(OH)_3$ or $SiO_2$ by reaction with alkali metal silicate or alkali metal aluminate solutions, respectively. The heterogeneous reaction of a reactant in a solid form with another component which is present in an aqueous solution, can also be conducted by the reaction of kaolin with aqueous alkali metal hydroxide. Finally, such substances are also formed from the melt, but this method seems of less economical interest because of the required high melting temperature and the necessity of transforming the melt into finely-dispersed moist products.

The cation-exchanging aluminosilicates to be used according to the invention are only formed if special precipit ation conditions are maintained, otherwise products are formed which have no, or an inadequate, calcium exchanging power. The calcium exchanging power of at least 50 mg CaO/gm of anhydrous active substance (AS) is critical to the present process. If aluminosilicates are employed with below the critical limit of calcium exchanging power, very little if any soil removal is effected in the absence of other types of calcium sequestering or precipitating agents. The production of usable aluminosilicates according to the invention is described in the experimental part.

The aluminosilicates in aqueous suspension produced by precipitation or by transformation in finely-dispersed form according to other methods can be transformed from the amorphous into the aged or the crystalline state by heating the mother liquor suspension to temperatures of 50° C. to 200° C. Although there is hardly any difference between these two forms as far as the calcium binding power is concerned, the crystalline aluminosilicates are preferred for the purpose of the invention. The preferred calcium binding power, which is in the range of 100 to 200 mg CaO/gm AS, is found primarily in compounds of the composition:

$$0.7 \text{ to } 1.1\ Na_2O\ .\ Al_2O_3\ .\ 1.3 \text{ to } 3.3\ SiO_3$$

This summation formula comprises two types of aluminosilicates which, if present in crystalline form, are distinguished by their crystal structures and their X-ray diffraction diagrams. These two types also differ by their summation formulas. These are:

(a) $0.7 \text{ to } 1.1\ Na_2O\ .\ Al_2O_3\ .\ 1.3 \text{ to } 2.4\ SiO_2$ (b) $0.7 \text{ to } 1.1\ Na_2O\ .\ Al_2O_3\ .\ >2.4 \text{ to } 3.3\ SiO_2$.

The different crystal structures can be seen in the X-ray diffraction diagram. The d-values found are given in the examples in the description of the production of the aluminosilicates I and II under the production conditions indicated therein.

The amorphous or crystalline aluminosilicates, at obtained by any of the above-described methods, or produced in any other manner, while still moist (i.e., no further drying step) or in the liquid suspension of precipitate and mother liquor, constitute the starting material for the process of the invention.

This method permits converting the freshly precipitated, X-ray amorphous, finely-divided aluminosilicates in the moist state or converted to the X-ray crystalline state, directly, i.e., without costly isolating and drying, into solid, preferably pourable washing and cleaning agents. It is a special advantage of the method that the aluminosilicate particles essentially preserve their degree of division as determined by the manufacturing conditions, whereas with an interim drying, they bake together to larger structures which require further processing to obtain the desired finely-divided particles.

Preferably, aluminosilicates, of which at least 80% by weight have a particle size of 0.01 to 10μ, preferably 0.1 to 8μ, are used in the process. Advantageously, they should have no particles above 40μ. To distinguish these fine aluminosilicates from the coarser products in this specification, they are designated, especially in the experimental part, as "microcrystalline" or "m."

The aluminosilicates to be used according to the invention for further processing are essentially in the following states as starting materials:

(a) Still fluid suspensions of the aluminosilicate in the mother liquor in which it is present at the end of the production process. The term "production process" comprises any desired process, including a possible after-treatment, as for example, aging or crystallizing, and the mother liquor preferably contains no aluminum compounds in solution;

(b) Aluminosilicate, from which the mother liquor has in part been separated;

(c) Still fluid suspension of the aluminosilicate in water, as obtained after partial or complete washing out of the mother liquor, and (d) Aluminosilicate as from (c), from which the wash water has been separated in part.

The starting states defined under (b) and (d) comprise above all viscous pastes, but also include products which already appear powdery, but contain still adhering water (as distinguished from variable amounts of water of crystallization).

The mother liquor usually still contains excess caustic alkalis and/or alkali metal silicates, which during the further processing of the aluminosilicates can be converted into constituents of the washing or cleaning agents to be produced, preferably by neutralization with acids or acid salts.

The latter may be inorganic, as for example, carbon dioxide, bicarbonates, sulfuric acid, bisulfates, other mineral acids, etc., but also organic acids can serve for this purpose, as for example, fatty acids or anionic surface-active compounds in acid form. Also substances which are not acid but convertible by alkaline saponification into anionic surface-active compounds are usable, such as the $SO_3$-sulfonation products of olefins and the sulfoxidation or sulfochlorination products of alkanes. Additional acids usable at this point are sequestering agents or precipitants for calcium (builder salts) frequently used in washing agents.

Partial or complete separation of the mother liquor may be advantageous if either the mother liquor is to be cycled back into the manufacture of the aluminosilicates, or if neutral or weakly alkaline reacting washing agents are to be produced.

The conversion of the still moist aluminosilicates into solid, preferably pourable washing and cleaning agents is possible essentially according to two process principles:

(1) The moist mixture of the aluminosilicates with at least a part of the other washing agent components is converted to a pourable state by drying, and (2) The aluminosilicate in contact with water or mother liquor is mixed with substances which bind water as water of hydration and/or water of crystallization.

The first principle can be carried into effect in the practice by hot atomization (spray drying) or drying of the water-containing mixture on hot surfaces.

For the second principle, there are several possibilities of realization. With still fluid aluminosilicate suspensions to start with, these can be sprayed onto at least one moving solid component, which can be done, for example, on moving plates, in rotating drums, in bucket conveyors and in fluidized beds. If the aluminosilicates are present as moist, but no longer fluid masses of a powdery appearance, it is often sufficient to mix them with the solid components of the washing or cleaning agent to be manufactured to obtain a granulated product.

The washing or cleaning agents according to the invention may contain, for example, in addition to the anionic surface-active compounds and/or builder salts already mentioned, also the following components: non-surface-active type foam stabilizers or inhibitors, textile softeners, chemically active bleaching agents, as well as stabilizers and/or activators for the same, soil suspension agents, corrosion inhibitors, antimicrobial substances, enzymes, optical brighteners, dyes and perfumes, etc. Some of these, for example, percompounds, active chlorine compounds and some enzymes, are not stable to mcisture and/or heat, so that they are usually admixed to the dry and cooled pourable product premix. Also oily or pasty components, such as nonionic surface-active compounds, antimicrobial substances, etc., are frequently added afterward to the finished pourable product.

There follows now an enumeration according to substance groups of the possible components of the washing or cleaning agent according to the invention.

The surface-active compounds or tensides contain in the molecule at least one hydrophobic organic moiety and one water-stabilizing, anionic, nonionic or amphoteric group. The hydrophobic moiety is mostly an aliphatic hydrocarbon radical with 8 to 26, preferably 10 to 22 and particularly 12 to 18, carbon atoms or an alkyl aromatic radical, such as alkylphenyl, with 6 to 18, preferably 8 to 16, aliphatic carbon atoms.

Among the anionic surface-active compounds are, for example, soaps of natural or synthetic, preferably saturated, fatty acids, optionally, also soaps of resinic or naphthenic acids. Suitable synthetic anionic tensides are those of the type of the sulfonates, sulfates, and synthetic carboxylates.

Suitable anionic tensides of the sulfonate type are alkylbenzene sulfonates ($C_{9-15}$ alkyl) mixtures of alkenesulfonates and hydroxyalkanesulfonates, as well as alkanedisulfonate as they are obtained, for example, from monoolefins with terminal or non-terminal double bonds by sulfonation with gaseous sulfur trioxide and subsequent alkaline or acid hydrolysis of the sulfonation products. Also suitable are alkanesulfonates which are obtained from alkanes by sulfochlorination or sulfoxidation and subsequent hydrolysis or neutralization or by bisulfite addition to olefins. Other suitable tensides of the sulfonate type are the esters of $\alpha$-sulfofatty acids, for example, the $\alpha$-sulfonic acids of hydrogenated methyl or ethyl esters of coconut, palm kernel or tallow fatty acids.

Suitable tensides of the sulfate type are the sulfuric acid monoesters of primary alcohols (e.g., from coconut fatty alcohols, tallow fatty alcohols or oleyl alcohol) and those of secondary alcohols. Also suitable are sulfated fatty acid alkanolamides, sulfated fatty acid monoglycerides or sulfated reaction products of 1 to 4 mols of ethylene oxide with primary or secondary fatty alcohols or alkylphenols.

Other suitable anionic tensides are the fatty acid esters or amides of hydroxy- or amino-carboxylic acids or sulfonic acids, such as the fatty acid sarcosides, fatty acid glycolates, fatty acid lactates, fatty acid taurides or fatty acid isoethionates.

The anionic tensides can be present in the form of their alkali metal salts, such as the sodium or potassium salts, the ammonium salts, as well as soluble salts of organic bases, such as the lower alkylolamines, for example, mono-, di- or triethanol amines.

Suitable nonionic surface-active compounds or tensides are the addition products of 4 to 40, preferably 4 to 20,mols of ethylene oxide to 1 mol of a fatty alcohol, alkylphenol, fatty acid, fatty amine, fatty acid amine or alkanesulfonamide. Particularly important are the addition products of 5 to 15 mols of ethylene oxide to coconut fatty alcohols or tallow fatty alcohols, to oleyl alcohol or to secondary alkanols with 8 to 18, preferably 12 to 18, carbon atoms, as well as monoalkylphenols or dialkylphenols with 6 to 14 carbon atoms in the alkyls. In addition to these water-soluble nonionics, polyglycol ethers with 1 to 4 ethylene glycol ether radicals in the molecule, which are insoluble or not completely water soluble, are also of interest, particularly if they are used together with water-soluble, nonionic or anionic tensides.

Furthermore, the water-soluble addition products of ethylene-oxide to polyoxypropylene glycol containing 10 to 100 propylene glycol ether groups (Pluronics ®), to alkylenediamine-polyoxypropylene glycol (Tetronics ®), and to alkylpolyoxypropylene glycols with 1 to 10 carbon atoms in the alkyl chain, can also be used where the polyoxypropylene glycol chain acts as a hydrophobic radical. Nonionic tensides of the type of the amine oxides or sulfoxides can also be used.

The foaming power of the tenside can be increased or reduced by combination of suitable tenside types. A reduction can also be achieved by additions of non-surface-active organic substances.

Suitable foam stabilizers, particularly in tensides of the sulfonate or sulfate type, are surface-active carboxy or sulfobetaines, as well as the above-named nonionics of the alkylolamide type. Moreover, fatty alcohols or higher terminal diols have been suggested for this purpose.

A reduced foaming power, that is desirable for the use in washing machines, is often attained by combination of different tenside types, such as of sulfates and/or sulfonates with nonionics, and/or with soaps. In soaps, the foam inhibition increases with the degree of saturation and the number of carbons in the fatty acid residue. Soaps derived from saturated $C_{20-24}$ fatty acids have been proven good as foam inhibitors.

The non-tenside foam inhibitors included N-alkylated aminotriazines, optionally containing chlorine, which are obtained by the reaction of 1 mol of cyanuric acid chloride with 2 to 3 mols of a mono- and/or dialkylamine with 6 to 20, preferably 8 to 18, carbon atoms in the alkyl radicals. Similarly effective are propoxylated and/or butoxylated aminotriazines, such as products that are obtained by the addition of from 5 to 10 mols of propylene oxide to 1 mol of melamine and further addition of from 10 to 50 mols of butylene oxide to this propylene-oxide derivative.

Likewise suitable as non-tenside foam inhibitors are water-insoluble organic compounds, like paraffins, or halogenated paraffins with melting points below 100° C., aliphatic $C_{18}$ to $C_{40}$ ketones, as well as aliphatic carboxylic acid esters which contain in the acid or alcohol residue, optionally, also in both of these residues, at least 18 carbon atoms (such as triglycerides or fatty acid/fatty alcohol esters). These compounds can be used to reduce foaming, particularly in combinations of tensides of the sulfate and/or sulfonate type with soaps.

Particularly low foaming nonionics, which can be used either alone or in combination with anionic, amphoteric and nonionic tensides, and which reduce the foaming power of high foaming tensides, are the addition products of propylene oxide on the above-described surface-active polypropylene oxyethylene glycol ethers as well as the likewise-described addition products of ethylene oxide to polyoxypropylene glycols and alkylenediamine polyoxypropylene glycols or to alkyl polyoxypropylene glycols having 1 to 10 carbon atoms in the alkyl.

Weakly acid, neutral or alkaline-reacting inorganic or organic salts can be used as builder salts. Suitable weakly acid, neutral or alkaline-reacting salts for use according to the invention are, for example, the bicarbonates, carbonates, borates or silicates of the alkali metal sulfates, as well as the alkali metal salts of organic, non-surface-active sulfonic acids, carboxylic acids and sulfocarboxylic acids containing from 1 to 8 carbon atoms. These include, for example, water-soluble salts of benzenesulfonic acid, toluenesulfonic acid or xylene-sulfonic acid, water-soluble salts of sulfoacetic acid, sulfobenzoic acid or of sulfodicarboxylic acids.

Primarily suitable as builder salts, especially in combination with the above-mentioned alkalis, are substances which exert a complexing and/or precipitating effect upon the calcium which is present in the water as a hardness former component. For the purposes of the invention, also substances with such a minor complexing capability that they have, therefore, not been considered as typical complex formers for calcium are suitable as complex formers for calcium, although such compounds often possess the capability of delaying precipitation of calcium carbonate from aqueous solutions.

Among these complexing or precipitating agents belong those of inorganic nature, such as the alkali metal pyrophosphates, triphosphates, higher polyphosphates and metaphosphates.

The individual components of the products used as textile washing compositions, particularly the builder salts, are mostly so selected that the preparations react neutral to strongly alkaline, so that the pH value of a 1% solution of the preparation is mostly in the range of 7 to 12. Fine washing agents show mostly a neutral to weakly alkaline reaction (pH value=7 to 9.5) while soaking agents, prewashing agents and boiling washing agents are more alkaline (pH value=9.5 to 12, preferably 10 to 11.5).

Organic compounds which are used as sequestering or precipitating agents for calcium are the polycarboxylic acids, hydroxycarboxylic acids, aminocarboxylic acids, carboxyalkyl ethers of alkanepolyols, polyanionic polymers, particularly the polymeric carboxylic acids and the phosphonic acids, these compounds being used mostly in the form of their water-soluble salts.

Examples for polycarboxylic acids are the alkane polycarboxylic acids having from 2 to 20 carbon atoms, and the alkene polycarboxylic acids having from 4 to 10 carbon atoms, such as the dicarboxylic acids of the general formula:

$$HOOC-(CH_2)_n-COOH$$

where n is an integer from 0 to 8, as well as maleic acid, fumaric acid, methylenemalonic acid, citraconic acid, mesaconic acid, itaconic acid, non-cyclic polycarboxylic acids with at least 3 carboxyl groups in the molecule, like tricarballylic acid, aconitic acid, ethylene tetracarboxylic acid, 1,1,3,3-propane-tetracarboxylic acid, 1,1,3,3,5,5-pentane-hexacarboxylic acid, hexane-hexacarboxylic acid, cyclic di- or polycarboxylic acids, such as cyclopentanetetracarboxylic acid, tetrahydrofuran-tetracarboxylic acid, cyclohexane-hexacarboxylic acid, phthalic acid, terephthalic acid, benzene tri-, tetra- or pentacarboxylic acid as well as mellitic acid.

Examples for hydroxyalkanemono- or polycarboxylic acids and hydroxybenzenemono- or polycarboxylic acids are glycolic acid, lactic acid, malic acid, tartronic acid, methyltartronic acid, gluconic acid, glyceric acid, citric acid, tartaric acid, salicylic acid.

Examples for aminocarboxylic acids are glycine, glycylglycine, alanine, aspargine, glutamic acid, aminobenzoic acid, iminodi- or triacetic acid, hydroxyethyliminodiacetic acid, ethylenediaminetetraacetic acid, hydroxyethyl-ethylenediaminetriacetic acid, diethylenetriaminepentaacetic acid, as well as higher homologs which can be prepared by polymerization of a N-aziridyl carboxylic acid derivative, for example, of acetic acid, of succinic acid, of tricarballylic acid, and subsequent saponification, or by condensation of polyamines with a molecular weight of 500 to 10,000 with chloracetic acid salts or bromacetic acid salts.

Examples for carboxyalkyl ethers are 2,2-oxydisuccinic acid and other carboxyalkyl ethers with alkanepolyols and hydroxyalkanoic acids, particularly polycarboxylic acids containing carboxymethyl ether groups which include corresponding derivatives of the following polyhydric alcohols or hydrocarboxylic acids, which can be completely or partly etherified with glycolic acid, such as ethylene glycol, di- or trioxyethylene glycols, glycerin, di- or triglycerin, glycerin monomethyl ether, 2,2-di-hydroxymethyl-propanol, 1,1,1-trihydroxymethyl-ethane, 1,1,1-trihydroxymethyl-propane, erythrite, pentaerythrite, glycolic acid, lactic acid, tartronic acid, methyltartronic acid, glycinic acid, erthyronic acid, malic acid, citric acid, tartaric acid, trihydroxyglutaric acid, saccharic acid, mucic acid. In addition, the carboxymethyl ethers of sugar, starch and cellulose are mentioned as transition types to the polymeric carboxylic acids.

Among the polymeric carboxylic acids, the polymers of acrylic acid, hydroxyacrylic acid, maleic acid, itaconic acid, mesaconic acid, aconitic acid, methylenemalonic acid, citraconic acid, etc., the copolymers of said carboxylic acids with each other or with ethylenic-unsaturated compounds, like ethylene, propylene, isobutylene, vinyl alcohol, vinyl methyl ether, furan, acrolein, vinyl acetate, acrylamide, acrylonitrile, methacrylic acid, crotonic acid, etc., such as 1:1 copolymers of maleic acid anhydride and ethylene and propylene or furan, play a particular part.

Other polymeric carboxylic acids of the type of polyhydroxypolycarboxylic acids or polyaldehydropolycarboxylic acids are substances substantially composed of acrylic acid and acrolein units or of acrylic acid and vinyl alcohol units, which can be obtained by copolymerization of acrylic acid and acrolein or by polymerization of acrolein and subsequent Cannizzaro reaction, if necessary, in the presence of formaldehyde.

Examples of phosphorus-containing organic sequestering agents are the alkanepolyphosphonic acids, aminoalkanepolyphosphonic acids, hydroxyalkanepolyphosphonic acids and phosphonocarboxylic acids, such as the compounds:

methanediphosphonic acid,
propane-1,2,3-triphosphonic acid,
butane-1,2,3,4-tetraphosphonic acid,
polyvinyl phosphonic acid,
1-amino-ethane-1,1-diphosphonic acid,
1-amino-1-phenyl-methane-1,1-diphosphonic acid,
amino-trimethylenephosphonic acid,
methyl-amino-dimethylenephosphonic acid,
ethylaminodimethylenephosphonic acid,
1-hydroxy-ethane-1,1-diphosphonic acid,
phosphonoacetic acid,
phosphonopropionic acid,
1-phosphonoethane-1,2-dicarboxylic acid,
2-phosphonopropane-2,3-dicarboxylic acid,
2-phosphonobutane-1,2,4-tricarboxylic acid,
2-phosphonobutane-2,3,4-tricarboxylic acid,
as well as copolymers of vinyl phosphonic acid and acrylic acid.

By using the above-described aluminosilicates according to the invention, it is readily possible, even when using phosphorus-containing inorganic or organic sequestering or precipitaing agents for calcium, to keep the phosphorus content of the wash liquors at a maximum of 0.6 gm/l, preferably at a maximum of 0.3 gm/l. But it is also possible to effect the method of the invention in the absence of phosphorus-containing compounds with good results.

Among the compounds serving as bleaching agents and releasing $H_2O_2$ in water, sodium perborate tetrahydrate ($NaBO_2 . H_2O_3 . 3 H_2O$) and the monohydrate ($NaBO_2 . H_2O_2$) are of particular importance, but also other $H_2O_2$-releasing borates can also be used, such as perborax ($Na_2B_4O_7 . 4 H_2O$). These compounds can be replaced partly or completely by other carriers of active oxygen, particularly by peroxyhydrates, such as peroxycarbonates ($Na_2CO_3 . 1.5 H_2O_2$), peroxypyrophosphates, citrate perhydrates, urea-$H_2O_2$ compounds, as well as by $H_2O_2$-releasing peracid salts, such as Caroates ($KHSO_5$), perbenzoates or peroxyphthalates.

It is recommended to incorporate water-soluble and/or water-insoluble stabilizers for the peroxy compounds together with the latter in amounts of 0.25% to 10% by weight. Water-insoluble stabilizers, which amount to 1% to 8%, preferably 2% to 7%, of the weight of the entire preparation are, for example, the magnesium silicate having a $MgO:SiO_2$ ratio of 4:1 to 1:4, preferably 2:1 to 1:2, and particularly 1:1, which are mostly obtained by precipitation from aqueous solutions. In their place, other alkaline earth metal, cadmium or tin silicates of corresponding compositions are also usable. Also hydrous oxides of tin are suitable as stabilizers. Water-soluble stabilizers, which can be present together with water-insoluble stabilizers, are mostly the organic sequestering agents which can be added in amounts of 0.25% to 5%, preferably 0.5% to 2.5%, of the weight of the entire preparation.

In order to obtain a satisfactory bleaching effect when washing at temperatures below 80° C., particularly in the range of 60° to 40° C., activator-containing bleaching components are preferably incorporated in the preparations.

Certain N-acyl and/or O-acyl compounds forming, with $H_2O_2$, organic peracids serve as activators for percompounds releasing $H_2O_2$ in water, Particularly to be mentioned are acetyl, propionyl or benzoyl compounds, as well as carbonic acid or pyrocarbonic acid esters. Suitable compounds among others are:

the N-diacylated and N,N'-tetraacylated amines, such as
N,N,N',N'-tetraacetyl-methylenediamine,
N,N,N',N'-tetraacetyl-ethylenediamine,
N,N, -diacetyl-aniline and N,N-diacetyl-p-toluidine; or the 1,3-diacylated hydantoins and alkyl-N-sulfonyl-carbonamides, such as:
N-methyl-N-mesyl-acetamide,
N-methyl-N-mesyl-benzamide,
N-methyl-N-mesyl-p-nitrobenzamide, and
N-methyl-N-mesyl-p-methoxybenzamide;
the N- acylated cyclic hydrazides,
acylated triazoles or urazoles, such as:
monoacetyl maleic acid hydrazide;
the O,N,N-trisubstituted hydroxylamines, such as:
O-benzoyl-N,N-succinyl-hydroxylamine,
O-acetyl-N,N-succinyl-hydroxylamine,
O-p-methoxybenzoyl-N,N-succinyl-hydroxylamine,
O-p-nitrobenzoyl-N,N-succinyl-hydroxylamine, and
O,N,N-triacetyl-hydroxylamine;
the N,N-diacyl-sulfuryl-amides, such as:
N,N'-dimethyl-N,N'-diacetyl-sulfurylamide, and
N,N'-diethyl-N,N'-dipropionyl-sulfuryl amide;
the triacyl cyanurates, such as:
triacetylcyanurate or tribenzoyl cyanurate;
the carboxylic acid anhydrides, such as:
benzoic acid anhydride,
m-chlorobenzoic acid anhydride,
phthalic acid anhydride,
4-chlorophthalic acid anhydride;
the sugar esters, such as:
glucose pentaacetate;
the 1,3-diacyl-4,5-diacyloxyimidazolidines, for example, the compounds:
1,3-diformyl-4,5-diacetoxy-imidazolidine,
1,3-diacetyl-4,5-diacetoxy-imidazolidine,
1,3-diacetyl-4,5-dipropionyl-imidazolidine,
the acylated glycolurils, such as:
tetrapropionyl glycoluril or diacetyl-dibenzoyl glycoluril;
the diacylated 2,5-diketopiperazines, such as:
1,4-diacetyl-2,5-diketopiperazine,
1,4-dipropionyl-2,5-diketopiperazine,
1,4-dipropionyl-3,6-dimethyl-2,5-diketopiperazine; the acetylated or benzoylated products of propylene diurea or 2,2-dimethyl-propylene diurea [2,4,6,8-tetra-bicyclo(3,3,1)-nonane-3,7-dione or its 9,9-dimethyl derivative], and the sodium salts of p-(ethoxycarbonyloxy)-benzoic acid and p-(propoxycarbonyloxy)-benzene sulfonic acid.

The activated chlorine compounds serving as bleaching agents can be of an inorganic or organic nature. The inorganic active chlorine compounds include alkaline metal hypochlorites, which can be used particularly in the form of their mixed salts or addition compounds with orthophosphates or on condensed phosphates, such as with alkali metal pyrophosphates and polyphosphates, or with alkali metal silicates. If the washing agents and washing assistant compositions contain monopersulfates and chlorides, active chlorine is formed in aqueous solution.

The organic active-chlorine compounds which can be used are particularly the N-chloro compounds, where one or two chlorine atoms are linked to a nitrogen atom, the third valence of the nitrogen atoms leading preferably to a negative group, particularly to a CO- or $SO_2$-group. These compounds include dichlorocyanuric acid and trichlorocyanuric acid or their salts, chlorinated alkylguanides or alkylbiguanides, chlorinated hydantoins and chlorinated melamines.

The preparation according to the invention can furthermore contain soil suspension agents or dirt carriers, which keep the dirt released from the fibers in suspension in the liquor and so prevent graying. Suitable compounds are water-soluble colloids, mostly of an organic nature, such as the water-soluble salts of polymeric carboxylic acids, glue, gelatin, salts of ether carboxylic acids or ether sulfonic acids of starch or cellulose, or salts of acid sulfuric acid esters of cellulose or starch. Water-soluble polyamides containing acid groups are also suitable for this purpose. Furthermore, soluble starch preparations and other than the above-mentioned starch products can be used, for example, degraded starches, aldehyde starches, etc. Polyvinyl pyrrolidone can also be used.

The enzyme preparations to be used are mostly a mixture of enzymes with different effects, such as proteases, carbohydrases, esterases, lipases, oxidoreductases, catalases, peroxidases, ureases, isomerase lyases, transferases, desmolases, or nucleases. Of particular interest are the enzymes, obtained from bacteria strains or from fungi, such as *Bacillus subtilis* or *Streptomyces griseus*, particularly proteases and amylases, which are relatively stable towards alkalis, percompounds, and anionic tensides and are still effective at temperatures up to 70° C.

Enzyme preparations are marketed by the manufacturers mostly as aqueous solutions of the active substances or as powders, granulates or as cold-sprayed products. They frequently contain sodium sulfate, sodium chloride, alkali metal ortho-, pyro- and polyphosphates, particularly tripolyphosphate, as fillers. Dust-free preparations are particularly valued. These are obtained in a known manner by incorporating oily or pasty nonionics or by granulation with the aid of melts of water-of-crystallization-containing salts in their own water of crystallization.

Enzymes may be incorporated which are specific for certain types of soil, for example, proteases or amylases or lipases. Preferably, combinations of enzymes with different effects are used, particularly combinations of proteases and amylases.

The washing agents can contain optical brighteners, such as those for cotton, particularly derivatives of diaminostilbenedisulfonic acid or its alkali metal salts.

Suitable are, for example, salts of 4,4'-bis-(2-anilino-4-morpholino-1,3,5-triazin-6-yl-amino)-stilbene-2,2'-disulfonic acid or similar compounds which have instead of the morpholino group, a diethanolamino group, a methylamino group or a 2-methoxyethylamino group. Brighteners for polyamide fibers which can be used are those of the type of the 1,3-diaryl-2-pyrazolines, for example, the compound 1-(p-sulfamoylphenyl)-3-(p-chlorophenyl)-2-pyrazoline, as well as compounds of similar composition which have instead of the sulfamoyl group, for example, the methoxycarbonyl group, the 2-methoxyethoxycarbonyl group, the acetylamino group or the vinylsulfonyl group. Suitable polyamide brighteners are also the substituted aminocumarins, for example, 4-methyl-7-dimethylamino-cumarin or 4-methyl-7-diethylaminocumarin.

Furthermore, the compounds 1-(2-benzimidazolyl)-2-(1-hydroxyethyl-2-benzimidazolyl)-ethylene and 1-ethyl-3-phenyl-7-diethylamino-carbostyril can also be used as polyamide brighteners. Brighteners for polyester and polyamide fibers which can be used are the compounds 2,5-di-(2-benzoxazolyl)-thiophene, 2-(2-benzoxazolyl)-naphtho[2,3-b]-thiophene and 1,2-di-(5-methyl-2-benzoxazolyl)ethylene. Furthermore, brighteners of the type of the substituted 4,4'-distyryl-diphenyls can be utilized, for example, the compound 4,4'-bis-(4-chloro-3-sulfostyryl)diphenyl. Mixtures of the above-mentioned brighteners can likewise be used.

The aluminosilicate content of the products to be manufactured according to the invention may be in the range of 5% to 95%, preferably 15% to 60%. The amount of inorganic phosphates and/or organic phosphorus compounds present in the agents according to the invention should not be greater than corresponds to a total phosphorus content of the agent of 6%, preferably 3%.

The composition of typical textile washing agents to be used at temperatures in the range of 50° to 100° C. usually fall in the range of the following recipe:

5% to 30% of anionic and/or nonionic and/or amphoteric surface-active compounds,
5% to 70% of aluminosilicates (related to AS),
2% to 45% of sequestering agents for calcium,
0 to 50% of wash alkalis not capable of sequestration (alkaline builder salts),
0 to 50% of bleaches as well as other additives mostly contained in detergents in small quantities.

In contrast to textile washing, dishwashing by machine requires the use of cleaning agents whose composition necessarily differs from that of the textile washing agents because of the different kind of materials to be cleaned and the different kind of soiling.

As dishes in the sense of the invention must be understood all implements of ceramic material, glass, plastic, wood and metal used in the household, in commercial operations and in the industry for storing, preparing and serving foods and beverages and to be cleaned after their use. The method according to the invention can be used, therefore, not only in the household and in the restaurant or hotel trade, but also in large kitchen facilities, dairies, in the beverage industry, as for example breweries, in plants producing or processing soft drinks, mineral water and fruit juices, for the machine washing and cleaning, in particular, of bottles.

The cleaning agents obtainable according to the invention are suitable also for washing laboratory equipment, also when soiled by residues other than food.

The aluminosilicates are preferably combined with alkaline reacting substances, which are used in such quantity that the pH value of the treatment bath is in the range of 8 to 13. Such alkaline reacting substances are preferably alkali metal silicates and alkali metal carbonates, and if higher pH values are desired, alkali metal hydroxides.

The effect of the cleaning agent to be produced according to the invention can be improved by addition of small quantities of surface-active compounds, in particular nonionic surface-active compounds. Besides, an addition of oxidizing substances has proved advantageous, in particular active chlorine compounds, possibly also percompounds.

The composition of the cleaning agents to be produced according to the invention lies generally within the following recipe:

10% to 60% of alkali metal silicates and/or carbonates and/or hydroxides and/or organic phosphorus-containing complexing agents for calcium,
10% to 65% of aluminosilicates (anhydrous basis),
0 to 40% of other usual components of dishwasher compositions.

The other usual components of dishwasher compositions include the following substances, usually present in the quantities stated:

0 to 10% of substances containing active chlorine or active oxygen,
0 to 10% of surface-active compounds, in particular nonionic surface-active compounds,
0 to 20% of sodium sulfate and/or water.

All these percentages are by weight. In the case of the aluminosilicates, they refer to the anhydrous active substance (AS).

The following examples are illustrative of the practice of the invention without being limitative in any respect.

EXAMPLES

There is described first the synthesis of the completely formed but still moist aluminosilicates used as starting materials for the process of the invention of preparing washing or cleaning agents, for which protection is not sought here.

For this purpose the alkali metal, preferably sodium, aluminate solution was admixed in a 15-liter vessel with the alkali metal, preferably sodium, silicate solution, while stirring vigorously (temperature of the solutions: 20° to 80° C.). In exothermal reaction there formed as primary precipitation product an X-ray amorphous sodium aluminosilicate. After vigorously stirring for ten minutes, the suspension of the precipitate was processed either directly, i.e., without crystallization, or it was left standing for three to six hours at 80° C. for the purpose of crystallization. The products thus obtained were completely crystalline according to X-ray structure analysis.

In some process variants the suspensions thus obtained of the X-ray amorphous or crystalline primary particles (particle size 0.5μ to 50μ, predominantly 1μ to 10μ) were used together with the mother liquor directly for the production of washing or cleaning agents. In other variants, the mother liquor was filtered off (suction filter or screen centrifuge) and the still moist aluminosilicate powder, optionally washed out with de-ionized water, was processed.

The active substance contents (=AS) of the processed starting materials were case material determined in the case of the suspensions by filtering the mother liquor and washing 10 in the wash water, in the case of the moist powders by again washing out in the manner described, then drying the washed residues, and heating the dried residues to 800° C. for one hour.

For the manufacture of microcrystalline aluminosilicates (identified by the addition "m"), the aluminate solution diluted with de-ionized water was mixed with the silicate solution and treated with a high speed intensive agitator (10,000 rpm, product "Ultraturrax" by the firm Janke and Kunkel IKA-Werk, Staufen/Breisgau, Federal Republic of Germany). After vigorously stirring for ten minutes, the suspension of the amorphous precipitate was transferred to a crystallizer where the formation of large crystals was prevented by stirring the suspension. After suction filtering the liquor from the crystal paste and rewashing with deionized water until the draining wash water had a pH of about 10, the filter residue was dried, then ground in a ball mill, and divided into two fractions in a centrifugal sifter (Microplex air sifter by the firm Alpine, Augsburg, Federal Republic of Germany), the finer of which contained no particles above 10μ. The grain size distribution was determined by means of a sedimantation scale.

The aluminosilicates obtained had the approximate composition, referred to anhydrous products (=AS):

$1\ Na_2O.1\ Al_2O_3.2\ SiO_2$

All quantities (percent or parts) are by weight.

The calcium binding power of the aluminosilicates was determined as follows: One liter of an aqueous solution, containing 0.594 gm of $CaCl_2$ (=300 mg CaO/liter=30° dH) and adjusted to a pH value of 10 with dilute NaOH, was admixed with 1 gm of aluminosilicate (AS basis). Then the suspension was stirred vigorously for 15 minutes at a temperature of 22° C. (±2° C.). After the aluminosilicate had been filtered off, the residual hardness x of the filtrate was determined. From this, the calcium binding power is calculated in mg CaO/gm AS according to the formula:

$(30-x).10$

For shorthand purposes the above procedure is hereinafter referred to as the Calcium Binding Power Test Method.

(1) Production Conditions for the Aluminosilicate Suspension S1

Precipitation:
8.450 kg aluminate solution of the composition: 11.3% $Na_2O$, 18.7% $Al_2O_3$, 70% $H_2O$,
6.550 kg of a 34.9% sodium silicate solution of the composition: $1\ Na_2O.3.46\ SiO_2$
Further processing: None
Excess $Na_2O$: 0.55 kg=3.7%
AS content: 4.25 kg=28.3%
Calcium binding power: 120 mg CaO/gm AS.

(2) Production Conditions for the Aluminosilicate Suspension S2

Precipitation: As under S1
Further processing: Crystallization
Excess $Na_2O$: 0.55 kg=3.7%
AS content: 4.25 kg=28.3%
Calcium binding power: 170 mg CaO/gm AS.

(3) Production Conditions for the Aluminosilicate Moist Powder P1

Precipitation: As under S1
Further processing: No crystallization, suction filtering of the mother liquor and rinsing with 10 liters of water.
AS content: 4.25 kg=34%
Calcium binding power: 120 mg CaO/gm AS.

(4) Production Conditions for the Aluminosilicate Moist Powder P2

Precipitation: As under S1
Further processing: Crystallization, suction filtering of the mother liquor and rinsing with 10 liters of water.
AS content: 4.25 kg=55%
Calcium binding power: 170 mg CaO/gm AS.

(5) Production Conditions for the Aluminosilicate Moist Powder P3

Precipitation: As under S1
Further processing: Crystallization, centrifuging of the mother liquor and rinsing with 10 liters of water.
AS content: 4.16 kg=65%
Calcium binding power: 170 mg CaO/gm AS.

There follows now the description of the production of some aluminosilicate suspensions in which the excess $Na_2O$ was reacted with $CO_2$ or $NaHCO_3$, as a first step in the production of washing or cleaning agent powders.

(6) Production Conditions for the Aluminosilicate Suspension S3

Precipitation: As under S1
Further processing: $CO_2$ was passed through the suspension until the calculated $CO_2$ absorption (0.39 kg) had been reached.
$Na_2CO_3$ content: 0.94 kg=6.1%
AS content: 4.25 kg=27.6%
Calcium binding power: 120 mg CaO/gm AS.

(7) Production Conditions for the Aluminosilicate Suspension S4

Precipitation: As under S1
Further processing: Crystallization, then introduction of $CO_2$ as for aluminosilicate suspension S3.
$Na_2CO_3$ content: 0.94 kg=6.1%
AS content: 4.25 kg=27.6%
Calcium binding power: 170 mg CaO/gm AS.

(8) Production Conditions for the Aluminosilicate Suspension S5

Precipitation: As under S1
Further processing: Crystallization, then 1.49 kg of $NaHCO_3$ were stirred into the suspension.
$Na_2CO_3$ content: 1.88 kg=11.3%
AS content: 4.25 kg=25.9%
Calcium binding power: 170 mg CaO/gm AS.

(9) Production Conditions for the Aluminosilicate Suspension S2m

Precipitation: As under S1, but under microcrystallization conditions of intense agitation during precipitation.
Excess $Na_2O$: 0.55 kg=3.7%
AS content: 4.25 kg=28.3%
Calcium binding power: 175 mg CaO/gm AS.

(10) Production Conditions for the Aluminosilicate Moist Powder P2m

Precipitation: As under S1, but under microcrystallization conditions.

Further processing: After crystallization, suction filtering of the mother liquor and rinsing with 10 liters of water.

AS content: 4.25 kg=55%

Calcium binding power: 175 mg CaO/gm AS.

(11) Production Conditions for the Aluminosilicate Moist Powder P3m

Precipitation: As under S1, but under microcrystallization conditions.

Further processing: After crystallization, centrifuging of the mother liquor and rinsing with 10 liters of water.

AS content: 4.16 kg=65%

Calcium binding power: 175 mg CaO/gm AS.

There follows now the description of the production of some aluminosilicate suspensions in which the excess $Na_2O$ was reacted with $CO_2$ and $NaHCO_3$, as a first step in the production of washing or cleaning agent powders.

(12) Production Conditions for the Aluminosilicate Suspension S4m

Precipitation: As under S1, but under microcrystallization conditions.

Further processing: After crystallization, introduction of $CO_2$ to the calculated $CO_2$ absorption (0.39 kg).

$Na_2CO_3$: 0.94 kg=6.1%

AS content: 4.25 kg=27.6%

Calcium binding power: 175 mg CaO/gm AS.

(13) Production Condition for the Aluminosilicate Suspension S5m

Precipitation: As under S1, but under microcrystallization conditions.

Further processing: After crystallization, stirring in of 1.49 kg of $NaHCO_3$ into the suspension.

$Na_2CO_3$ content: 1.88 kg=11.3%

AS content: 4.25 kg=25.9%

Calcium binding power: 175 mg CaO/gm AS.

The particle size distribution of the above-microcrystalline aluminosilicates, determined by sedimentation analysis, lay in the following range:

| | |
|---|---|
| Over 40μ = 0% | maximum range of the particle |
| Less than 10μ = 100% | size distribution curve at |
| Less than 8μ = 99% | 3 to 6μ |

(14) Production Conditions Starting from Kaolin

Kaolin was calcined by heating for three hours at 700° C. to produce amorphous metakaolin. 5.0 kg of this calcined metakaolin was mixed with a solution of 4.0 kg of NaOH (100%) in 36.0 kg of deionized water at a temperature of between 20° and 100° C. The suspension was stirred at a temperature of 85° to 90° C. for two hours. The suspension was allowed to cool and the mother liquor was then removed. The reaction product was washed with deionized water until the wash water had a pH value of 9 to 11. A sample of this wet filter cake was dried for four hours at 100° C. and then analyzed.

Oxide formula: 1.07 $Na_2O$.1 $Al_2O_3$.1.96 $SiO_2$.3.9 $H_2O$

Crystal structure: zeolite NaA

Calcium binding power: 161 mg CaO/gm AS at 22° C.

Particle size distribution: 100% below 15μ

(By sedimentation analysis) 50% below 6μ.

(15) Kaolin plus Aqueous NaOH/Waterglass Resulting in Zeolite X 2.6 kg of calcined metakaolin were mixed while still hot with a solution of 7.5 kg of NaOH (50% by weight), 7.5 kg of waterglass (sodium silicate solution with 8.0% by weight of $Na_2O$ and 26.9% by weight of $SiO_2$), and 51.5 kg of deionized water. The mixture was allowed to crystallize at 120° C. for 12 hours. Filtering and washing were conducted as above under (14). A sample of the wet filtercake was dried as above for analysis:

Oxide formula 0.88 $NaO_2$. 1 $Al_2O_3$.3.2 $SiO_2$.5.5 $H_2O$

Crystal structure: zeolite NaX

Calcium binding power: 107 mg CaO/gm AS at 22° C.

Particle size distribution: 100% below 15μ

(By sedimentation analysis) 90% below 10μ

(16) Solid Aluminate Plus Aqueous Sodium Silicate 0.84 kg of solid aluminate (38% by weight of $Na_2O$, 62% by weight of $Al_2O_3$) was mixed with 2.16 kg of a 34.9% aqueous solution of sodium silicate (1 $Na_2O$.3.46 $SiO_2$). The mixture was heated for 24 hours at 80° C. The resulting crystalline product was processed and analyzed as under (14). The wet filter cake consisted of zeolite A.

Oxide formula: 1.1 $Na_2O$.1 $Al_2O_3$.2.06 $SiO_2$.4.1 $H_2O$ (Sample dried for 24 hours at 100° C.)

Crystal structure: Zeolite NaA

Calcium binding power: 152 mg CaO/gm AS

Particle size distribution: 95% below 10μ

(By sedimentation analysis) 50% below 8μ

(17) Solid $SiO_2$ Plus Aqueous Aluminate 1.20 kg of microfine silica was suspended into a mixture of 8.37 kg of aluminate solution (20% by weight $Na_2O$, 10.2% by weight $Al_2O_3$, 69.8% by weight $H_2O$), 90 gm of NaOH, and 5.34 kg of deionized water. The suspension was allowed to react for twelve hours at 90° C. Processing and analysis of the reaction product as under (14). The wet filter cake consisted of zeolite A.

Oxide formula: 0.9 $Na_2O$.1 $Al_2O_3$.2.0 $SiO_2$.4.4 $H_2O$

Crystal structure: Zeolite NaA

Calcium binding power: 165 mg CaO/gm AS

Particle size distribution: 100% below 10μ

(By sedimentation analysis) 50% below 5μ

There follows now the description of the production of washing compositions according to the invention using the aluminosilicate suspensions or the moist aluminosilicate powders obtained as described above. The salt type components of the washing or cleaning agents named in the examples—salt-type, surface-active compounds, other organic salts and inorganic salts—were present as sodium salts unless expressly noted differently. The designations or abbreviations are as follows:

"ABS"—The salt of an alkylbenzene sulfonic acid obtained by condensing straight-chain olefins with benzene and sulfonating the alkylbenzene thus formed, with 10 to 15, preferably 11 to 13, carbon atoms in the alkyl chain;

"Soap"—A hardened mixture of equal parts by weight of tallow and rape oil fatty acids;

"OA+x EO"or "TA+x EO"—The addition products of ethylene oxide (EO) to technical oleyl alcohol (OA) or to tallow fatty alcohol (TA) (Iodine number 0.5), the numerical data for x identifying the molar quantity of ethylene oxide added to 1 mol of alcohol;

"Nonionic"—A product of addition of ethylene oxide to a polypropylene glycol ether of molecular weight 1900, obtainable under the tradename "Pluronic ® L 61", the proportion of the propylene oxide units constituting 90% by weight and the proportion of the ethylene oxide units 10% by weight;

"Perborate"—A technical product of the approximate composition $NaBO_2.H_2O_2.3\ H_2O$;

"Waterglass"—A 34.5% aqueous solution of sodium silicate of the composition $Na_2O\ .3.35\ SiO_2$;

"EDTA"—The salt of ethylene diaminetetraacetic acid;

"DCIC"—The sodium salt of dichloro-isocyanuric acid;

"CMC"—The sodium salt of carboxymethyl cellulose.

EXAMPLE 1

Washing agents in powder form of the final composition:

| | | | |
|---|---|---|---|
| 2.0% | ABS | 1.0% | CMC |
| 8.5% | OA + 10 EO | 1.0% | EDTA |
| 7.0% | $Na_5P_3O_{10}$ | 40.0% | aluminosilicate (AS) |
| 19.0% | $Na_2CO_3$ | 15.0% | water |
| 6.5% | $Na_2SiO_3$ | | |

were produced by the following methods, using the above-described aluminosilicate suspension of powders:

Method 1(a)

All the formula components were stirred succesively into 140 kg of the aluminosilicate suspension S1, and then the excess alkali was converted into $Na_2CO_3$ by reaction with 3.6 kg of gaseous $CO_2$. The resulting aqueous washing agent batch gave a pourable hollow-sphere powder after hot atomization.

By processing the aluminosilicate suspension S2 in the manner described, similar results were obtained.

Method 1(b)

The aluminosilicate moist powder P1 was mixed with ABS paste, diluted with the corresponding quantity of water, and then processed as described under 1(a), but without $CO_2$ treatment.

Method 1(c)

To carry out this method, a mixer of the form Lodige, Paderborn, Federal Republic of Germany, was used. This mixer consisted of a horizontal cylinder with cooling jacket. The contents of the cylinder were thoroughly mixed by rotating arms equipped with plowshare type vanes. After the dry formula components had been charged, the aluminosilicate moist powder P2 was mixed in which already resulted in granulation. Then the remaining formula components were injected. The still somewhat moist granulated product taken from the mixer was aerated to remove the heat of hydration. As final product, a pourable granulated material was obtained.

If, in this method, the aluminosilicate powder P3 was used, the granulation upon mixing in of the powder was greatly reduced because of its low water content. Granulation took place only after addition of the other formula components.

Method 1(d)

The procedure was as described under 1(a), but while using the aluminosilicate suspension S3 or S4. As the neutralization of the excess $Na_2O$ with $CO_2$ took place already in the suspension, it was not necessary to introduce $CO_2$ into the batch as described under 1(a).

When using for this method the alunimosilicate suspension S5 (addition of $NaHCO_3$), accordingly smaller quantities of $Na_2CO_3$ were needed in the production of the aqueous batch.

Method 1(e)

The method described under 1(c) was modified inasmuch as an aluminosilicate powder P2 not washed out was processed by injection of $CO_2$ into the mixer while neutralizing the excess $Na_2O$ still present in the alumino-silicate.

Method 1(f)

The method described under 1(a) was varied insofar as first the ABS was mixed as the free acid, with the aluminosilicate suspension S1 and then the remaining formula components were added.

The powders produced according to Method 1(a) to (f), in particular by hot atomization, can be transformed into bleaching washing agents by addition of perborate in amounts of 15% to 35% by weight.

EXAMPLE 2

For the production of a washing agent of the final composition:

| | | | |
|---|---|---|---|
| 3.5% | soap | 3.0% | waterglass |
| 7.0% | TA + 10 EO | 1.8% | CMC |
| 3.0% | TA + 5 EO | 0.5% | EDTA |
| 15.0% | aluminosilicate (AS) | 2.5% | $MgSiO_3$ |
| 20.0% | $Na_5P_3O_{10}$ | 5.0% | $Na_2CO_3$ |
| 28.0% | perborate | 11.7% | water |

A mixture of the solid components except the soap and the perborate was granulated similarly as described in Example 1(c) with admixture of a pasty mixture consisting of the aluminosilicate moist powder P1, the waterglass, the soap and the two EO derivatives. When using the water-poorer aluminosilicate powders P2 or P3, corresponding quantities of water were added. After the granulated material had cooled, the perborate was mixed in.

If the $Na_5P_3O_{10}$ was to be eliminated still further or completely, it was expediently replaced by a mixture of 65% $Na_2CO_3$ and 35% sodium citrate or 35% sodium O-carboxymethyl-tartrate.

EXAMPLE 3

To produce a detergent for household dishwashers of the final composition:

35.0% aluminosilicate (AS)
35.0% $Na_2SiO_3$
1.0% DCIC
10.0% nonionic
5.0% waterglass
14.0% water The mixer according to Example 1(c) was employed. Alumino-silicate moist powder P3, about one-half of the $Na_2SiO_3$ powder and the nonionic were charged. Onto this moving powder mixture, the waterglass was sprayed, and the remaining $Na_2SiO_3$ as well as the DCIC were added. A current of air was passed through the primary granulate in the mixture, owing to which part of the water introduced evaporated.

EXAMPLE 4

A detergent containing caustic alkali of the composition:

35.0% aluminosilicate
11.0% $Na_2SiO_3$
15.0% $Na_2CO_3$
4.0% DCIC
11.0% NaOH
6.0% waterglass
18.0% water was produced by operating, using one of the aluminosilicate suspensions S1 or S2 with addition of NaOH, in analogous manner as described in Example 3.

If in the case of Examples 1 and 2 the ABS or the soap was replaced by other anionic surface-active compounds, as for example, olefinsulfonates, alkanesulfonates or esters of α-sulfo fatty acids, similar results were obtained. Also the fatty alcohol-EO derivatives contained in the washing agents according to Example 1 and 2 could be replaced partly or completely by the anionic surface-active agents referred to. However, in all these cases, a changed foaming behavior of the washing agents must be expected.

As the examples show, the aluminosilicate can be processed directly to pourable washing or cleaning agents, without isolating it from the mother liquor or if the mother liquor has been separated entirely or partly, without drying it. Thereby the efficiency of the aluminosilicates in the washing or cleaning agents obtainable according to the invention is in no way impaired, as it tends to be if it is dried before incorporating in the washing or cleaning composition.

The manufacturing methods described in Examples 1 to 4 were carried out also using the following moist microcrystalline aluminosilicates:

In Example 1(a)—Aluminosilicate suspension S2m
In Example 1(c)—Aluminosilicate moist powder P2m
In Example 1(d)—Aluminosilicate suspension S4m.

If the aluminosilicate suspension S5m was used in this process ($NaHCO_3$ addition), correspondingly smaller amounts of $Na_2CO_3$ were required in the production of the aqueous batch.

In Example 1(e)—Aluminosilicate moist powder P2m
In Example 1(f)—Aluminosilicate suspension P2m
In Example 2—Aluminosilicate moist powder P2m or aluminosilicate moist powder P3m
In Example 3—Aluminosilicate moist powder 14, 15, 16 or 17 or P3m
In Example 4—Aluminosilicate moist powder 14, 15, 16 or 17 or suspension 52m.

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. In a process for preparing a solid, pourable, washing and cleaning multicomponent composition by mixing the components including at least one crystallized water-insoluble alkali metal aluminosilicate produced synthetically and allowing the reaction product to crystallize to a water-insoluble alkali metal aluminosilicate having a calcium binding powder when measured at 22° C. by the Calcium Binding Power Test Method set out in the specification, of at least 50 mg CaO/gm of anhydrous active substance and the formula on the anhydrous basis:

$$(M_2O)_x.Al_2O_3.(SiO_2)_y$$

where M is an alkali metal, x is a number from 0.7 to 1.5, and y is a number from 1.3 to 4, the improvement which comprises mixing the crystallized aluminosilicate in the moist state from its production in the form of an aqueous fluid suspension or an aqueous, viscous paste, without interim drying after its production process, but after removal of at least some of the mother liquor from its production process with at least part of the other components and recovering said solid, pourable, washing and cleaning composition.

2. The process of claim 1 wherein said aluminosilicate in the moist state is after removal of all the mother liquor and at least partial replacement by water.

3. The process of claim 1 wherein said calcium binding power of said aluminosilicate is from 50 to 200 mg CaO/gm of anhydrous active substance when measured at 22° C. by the Calcium Binding Power Test Method set out in the specification.

4. The process of claim 1 wherein said calcium binding power of said aluminosilicate is from 100 to 200 mg CaO/gm of anhydrous active substance when measured at 22° C. by the Calcium Binding Power Test Method set out in the specification.

5. The process of claim 1 wherein in said formula for said aluminosilicate x is a number from 0.7 to 1.1, y is a number from 1.3 to 3.3 and M is sodium.

6. The process of claim 1 wherein at least 80% by weight of the particles of said aluminosilicate have a size of from 10μ to 0.01μ.

7. The process of claim 1 wherein at least 80% by weight of the particles of said aluminosilicate have a size of from 8μ to 0.1μ.

8. The process of claim 1 wherein said aluminosilicate has no particles above 40μ.

9. In a process for preparing a solid, pourable, washing and cleaning multicomponent composition by mixing the components including at least one crystallized water-insoluble alkali metal aluminosilicate produced synthetically by reacting a water-soluble alkali metal silicate with a water-soluble alkali metal aluminate in the presence of water and allowing the reaction product to crystallize to a water-insoluble alkali metal aluminosilicate having a calcium binding power when measured at 22° C. by the Calcium Binding Power Test Method set out in the specification, of at least 50 mg CaO/gm of anhydrous active substance and the formula on the anhydrous basis:

$$(M_2O)_x.Al_2O_3.(SiO_2)_y$$

where M is an alkali metal, x is a number from 0.7 to 1.5, and y is a number from 1.3 to 4, the improvement which comprises mixing the crystallized aluminosilicate in the moist state from its production in the form of an aqueous fluid suspension or an aqueous, viscous paste, without interim drying after its production process, but after removal of at least some of the mother liquor from its production process and replacement by water, with at least part of the other components and recovering said solid, pourable, washing and cleaning composition.

10. The process of claim 9 wherein said aluminosilicate in the moist state is after removal of all the mother liquor.

11. The process of claim 9 wherein said calcium binding power of said aluminosilicate is from 50 to 200 mg CaO/gm of anhydrous active substance when measured at 22° C. by the Calcium Binding Power Test Method set out in the specification.

12. The process of claim 11 wherein said calcium binding power of said aluminosilicate is from 100 to 200 mg CaO/gm of anhydrous active substance when measured at 22° C. by the Calcium Binding Power Test Method set out in the specification.

13. The process of claim 9 wherein in said formula for said aluminosilicate x is a number from 0.7 to 1.1, y is a number from 1.3 to 3.3 and M is sodium.

14. The process of claim 9 wherein at least 80% by weight of the particles of said aluminosilicate have a size of from 10μ to 0.01μ.

15. The process of claim 9 wherein at least 80% by weight of the particles of said aluminosilicate have a size of from 8μ to 0.1μ.

16. The process of claim 9 wherein said aluminosilicate has no particles above 40μ.

17. In a process for preparing a solid, pourable, washing and cleaning multicomponent composition by mixing the components including at least one cystallized water-insoluble alkali metal aluminosilicate produced synthetically by reacting one component present in a solid form with another component present in an aqueous solution, allowing the reaction product to crystallize to a water-insoluble alkali metal aluminosilicate having a calcium binding power when measured at 22° C. by the Calcium Binding Power Test Method set out in the specification, of at least 50 mg CaO/gm of anhydrous active substance and the formula on the anhydrous basis:

$$(M_2O)_x.Al_2O_3.(SiO_2)_y$$

where M is an alkali metal, x is a number from 0.7 to 1.5, and y is a number from 1.3 to 4, the improvement which comprises mixing the crystallized aluminosilicate in the moist state from its production in the form of an aqueous fluid suspension or an aqueous, viscous paste, without interim drying after its production process, but after removal of at least some of the mother liquor from its production process, with at least part of the other components and recovering said solid, pourable, washing and cleaning composition.

18. The process of claim 17 wherein said aluminosilicate in the moist state is after removal of all the mother liquor and at least partial replacement by water.

* * * * *